United States Patent
Davydov (10) Patent No.: US 8,407,098 B2
(45) Date of Patent: Mar. 26, 2013

(54) METHOD, MEDIUM, AND SYSTEM FOR ORDERING A PLAYLIST BASED ON MEDIA POPULARITY

(75) Inventor: Anton Davydov, Gilroy, CA (US)

(73) Assignee: Apple Inc., Cupertino, CA (US)

( * ) Notice: Subject to any disclaimer, the term of this patent is extended or adjusted under 35 U.S.C. 154(b) by 403 days.

(21) Appl. No.: 12/271,177

(22) Filed: Nov. 14, 2008

(65) Prior Publication Data

US 2010/0125351 A1 May 20, 2010

(51) Int. Cl.
*G06Q 30/00* (2012.01)
(52) U.S. Cl. .................... 705/26.1; 707/999.007
(58) Field of Classification Search .......... 705/26, 705/27, 26.1, 27.1; 707/999.007, 748
See application file for complete search history.

(56) References Cited

U.S. PATENT DOCUMENTS

| | | | |
|---|---|---|---|
| 6,965,770 B2* | 11/2005 | Walsh et al. ............... 455/426.1 |
| 7,603,362 B2* | 10/2009 | Elliott et al. ..................... 1/1 |
| 7,685,204 B2* | 3/2010 | Rogers ........................ 707/770 |
| 2002/0078045 A1* | 6/2002 | Dutta ............................... 707/7 |
| 2003/0093338 A1* | 5/2003 | Kim et al. ...................... 705/27 |
| 2003/0135513 A1* | 7/2003 | Quinn et al. ................. 707/102 |
| 2003/0225834 A1* | 12/2003 | Lee et al. ...................... 709/204 |
| 2004/0088328 A1* | 5/2004 | Cook et al. ................. 707/104.1 |
| 2004/0181802 A1* | 9/2004 | Bollapragada et al. ......... 725/36 |
| 2006/0008256 A1* | 1/2006 | Khedouri et al. ............. 386/124 |
| 2006/0195521 A1 | 8/2006 | New et al. |
| 2006/0195790 A1* | 8/2006 | Beaupre et al. ............... 715/727 |
| 2006/0253782 A1* | 11/2006 | Stark et al. ..................... 715/727 |
| 2006/0265421 A1* | 11/2006 | Ranasinghe et al. ........ 707/104.1 |
| 2007/0232223 A1* | 10/2007 | Bilange ......................... 455/3.06 |
| 2008/0056075 A1* | 3/2008 | Kalis ........................... 369/30.05 |
| 2008/0086379 A1* | 4/2008 | Dion et al. ....................... 705/14 |
| 2008/0115173 A1* | 5/2008 | Ellis et al. ........................ 725/61 |
| 2008/0155634 A1* | 6/2008 | Khedouri et al. ............. 725/118 |
| 2008/0256032 A1 | 10/2008 | Vignoli et al. |
| 2008/0257134 A1* | 10/2008 | Oppenheimer ................. 84/609 |
| 2009/0055396 A1* | 2/2009 | Svendsen et al. .................. 707/7 |
| 2009/0056525 A1* | 3/2009 | Oppenheimber ............... 84/609 |
| 2009/0063496 A1* | 3/2009 | Cunningham et al. .......... 707/10 |
| 2009/0077052 A1* | 3/2009 | Farrelly ............................. 707/5 |

OTHER PUBLICATIONS

Jun. 2005—http://citeseerx.ist.psu.edu/viewdoc/download?doi=10.1.1.106.7181&rep=rep1&type=pdf.*

* cited by examiner

*Primary Examiner* — Matthew Zimmerman
(74) *Attorney, Agent, or Firm* — Kilpatrick Townsend & Stockton LLP (57) ABSTRACT

This is directed to systems and methods for ordering a playlist of media items. An existing playlist can include media sharing some characteristics, where some of the media items are unfamiliar to the user. To provide the user with a sense of the unfamiliar media items, the electronic device can order the playlist media items based on a familiarity or popularity measure. For example, the electronic device can determine the chart rankings of each media item in the playlist, and play back the media items in the order of chart ranking. This may allow a user to first listen or watch the most familiar or popular media items and get a sense for the less familiar or popular media items in the playlist.

45 Claims, 6 Drawing Sheets

| | Name | | Time | Artist | | Album by Artist | | Price | |
|---|---|---|---|---|---|---|---|---|---|
| 48 | Ventura Highway | ⊕ | 3:33 | America | ⊕ | America: The Co... | ◁ | $0.99 | BUY SONG |
| 66 | Neighborhood #1 (Tunnels) | ⊕ | 4:48 | Arcade Fire | ⊕ | Funeral | ◁ | $0.99 | BUY SONG |
| 59 | Dancing in the Moonlight | ⊕ | 4:12 | Baha Men | ⊕ | Kalik | ◁ | $0.99 | BUY SONG |
| 80 | Ch-Check It Out [EXPLICIT] | ⊕ | 3:12 | Beastie Boys | ⊕ | To the 5 Boroughs | ◁ | ⊞ $0.99 | BUY SONG |
| 53 | How Deep Is Your Love | ⊕ | 4:05 | Bee Gees | ⊕ | Bee Gees: Great... | ◁ | $0.99 | BUY SONG |
| 49 | Another Lonely Day | ⊕ | 3:44 | Ben Harper | ⊕ | Fight for Your M... | ◁ | ⊞ $0.99 | BUY SONG |
| 67 | Way over Yonder in the Minor ... | ⊕ | 4:06 | Billy Bragg & Wilco | ⊕ | Mermaid Avenue | ◁ | $0.99 | BUY SONG |
| 27 | Soul Rebel | ⊕ | 3:33 | Blitz | ⊕ | Soul Rebel | ◁ | ⊞ $0.99 | BUY SONG |
| 47 | Knockin' On Heavens Door | ⊕ | 2:31 | Bob Dylan | ⊕ | The Essential Bo... | ◁ | $0.99 | BUY SONG |
| 2 | Girl from the North Country | ⊕ | 3:22 | Bob Dylan | ⊕ | The Freewheelin... | ◁ | $0.99 | BUY SONG |
| 73 | Thunder Road | ⊕ | 4:47 | Bruce Springsteen | ⊕ | Born to Run | ◁ | $0.99 | BUY SONG |
| 13 | Let's Go | ⊕ | 3:33 | The Cars | ⊕ | The Cars: Compl... | ◁ | $0.99 | BUY SONG |
| 43 | The Wind | ⊕ | 1:42 | Cat Stevens | ⊕ | The Very Best of... | ◁ | $0.99 | BUY SONG |
| 20 | I Used to Love H.E.R. [EXPLICIT] | ⊕ | 4:40 | Common | ⊕ | Thisisme Then - | | ⊞ $0.99 | BUY SONG |
| 45 | Monkey | ⊕ | 3:01 | Counting Crows | ⊕ | Recovering the S... | ◁ | $0.99 | BUY SONG |
| 31 | Move On Up | ⊕ | 3:41 | Curtis Mayfield | ⊕ | Future Shock (R... | ◁ | $0.99 | BUY SONG |
| 22 | El Chupe Nibre | ⊕ | 2:35 | Danger Doom | ⊕ | The Mouse and ... | | $0.99 | BUY SONG |
| 39 | Stay or Leave | ⊕ | 4:00 | Dave Matthews ... | ⊕ | Some Devil | | $0.99 | BUY SONG |
| 3 | Ashes to Ashes | ⊕ | 3:38 | David Bowie | ⊕ | Best of Bowie | ◁ | $0.99 | BUY SONG |
| 40 | Fix up, Look Sharp [EXPLICIT] | ⊕ | 3:44 | Dizzee Rascal | ⊕ | Boy in Da Corner | ◁ | $0.99 | BUY SONG |
| 79 | Do Ya | ⊕ | 3:45 | Electric Light Or... | ⊕ | A New World Re... | ◁ | $0.99 | BUY SONG |
| 78 | Suspicious Minds | ⊕ | 4:31 | Elvis Presley | ⊕ | Elvis #1 Singles | | $0.99 | BUY SONG |
| 55 | Burning Love | ⊕ | 2:56 | Elvis Presley | ⊕ | Elvis 30 #1 Hits | | $0.99 | BUY SONG |
| 25 | The Healer [CLEAN] | ⊕ | 3:59 | Erykah Badu | ⊕ | New Amerykah,... | | $0.99 | BUY SONG |
| 46 | Fields of Gold | ⊕ | 4:42 | Eva Cassidy | ⊕ | Songbird | | $0.99 | BUY SONG |
| 6 | Get Gone | ⊕ | 4:08 | Fiona Apple | ⊕ | When the Pawn... | ◁ | ⊞ $0.99 | BUY SONG |
| 10 | The W.A.N.D. | ⊕ | 3:44 | The Flaming Lips | ⊕ | At War With the ... | | $0.99 | BUY SONG |
| 11 | Landslide | ⊕ | 3:19 | Fleetwood Mac | ⊕ | Fleetwood Mac | | $0.99 | BUY SONG |
| 17 | Business Time | ⊕ | 4:05 | Flight of the Co ... | ⊕ | Flight of the Co... | | ⊞ $0.99 | BUY SONG |
| 1 | Times Like These | ⊕ | 4:25 | Foo Fighters | ⊕ | One by One | | $0.99 | BUY SONG |
| 62 | The Greatest Thing There Is | ⊕ | 4:02 | Gavin Osborn | ⊕ | In the Twee Sma... | ◁ | $0.99 | BUY SONG |
| 72 | Mr. Brownstone [EXPLICIT] | ⊕ | 3:48 | Guns N' Roses | ⊕ | Appetite for Des... | | ⊞ $0.99 | BUY SONG |
| 68 | Seth Davey | ⊕ | 3:36 | Hughie Jones | ⊕ | Liverpool Conne... | | $0.99 | BUY SONG |
| 23 | The Mission (Stringed [EXPLICIT] | ⊕ | 3:38 | Jaylib | ⊕ | Champion Soup | | ⊞ $0.99 | BUY SONG |

METHOD, MEDIUM, AND SYSTEM FOR ORDERING A PLAYLIST BASED ON MEDIA POPULARITY

BACKGROUND OF THE INVENTION

This invention is directed to systems and methods for ordering a playlist of media items.

Using various electronic devices, users can access and play back different types of media. In particular, some electronic devices can provide support for playlists by which a user can select a collection of media to play back sequentially. The media can be ordered in any suitable manner, including for example based on title, artist, date released, user-defined preference rating, genre, or using any other suitable criteria. In some embodiments, the order of played back media can be randomized. In still other embodiments, the user can define the particular order of the media in the playlist (e.g., by associating each media item with a playback position).

When a user has a large amount of media available for playback, or can access remote databases or sources of media, the user can have difficulty discovering new media, or remembering previously consumed media that was once of interest to the user. Using media comparison algorithms, some electronic devices can be operative to generate media playlists of media related to a selected seed. The user can then play back the generated playlists to discover or re-discover music related to the seed.

This type of an approach, however, is only used to generate a media playlist. In addition, the user cannot take an existing playlist and determine, from the playlist, which media items are of most interest to the user.

SUMMARY OF THE INVENTION

This is directed to systems and methods for ordering an existing media playlist based on received popularity ratings from an external source. For example, this is directed to systems and methods for ordering a music playlist based on media rankings in a Billboard or other music chart.

Using an electronic device, a user can consume different types of media. For example, a user can listen to music or other audio, view a video, or combinations of these. The consumed media can be organized using any suitable approach, including for example in a playlist of successive media items that can be played back for consumption. The playlist can include any suitable media, including for example media sharing one or more characteristics (e.g., media by a particular artist, in a particular album or compilation, or of a particular genre). In some embodiments, the playlist can include media with which the user is not particularly familiar, or media for the user to discover.

Because some media in a playlist can be better known than other media, the playback order of the media in the playlist can be defined such that more popular or known media is played back first, and only subsequently is lesser known media played back. This may be of particular interest when the media in the playlist shares a particular characteristic, as it can provide context for the user with respect to the remaining media items. For example, if the playlist includes media by a particular artist, or in a particular album or compilation, a user can quickly make an initial determination as to whether or not to listen to the remaining media items in the playlist based on appreciation or not of the better known media.

The electronic device can identify the more popular, familiar or notorious media items using any suitable approach. In some embodiments, each media item can include metadata defining the absolute or relative popularity of the media item. For example, the metadata can include a chart ranking based on sales figures or radio play requests. As another example, the metadata can include rankings from a list of most popular songs from a particular era, or of a particular genre. The popularity can be qualified using any suitable approach, including for example based on a date (e.g., chart ranking at a particular date), duration (e.g., length of time at a particular chart ranking), chart type (e.g., international, national, or regional chart), or any other suitable qualification. If a media item does not have metadata related to popularity, the electronic device can request popularity information from a rankings source or index, for example a rankings organization. The rankings source can provide appropriate ranking information based on, for example, the media title, artist, album or other existing metadata associated with the media item, or by identifying the media during playback (e.g., sampling the media and comparing the sample to a database of media samples).

BRIEF DESCRIPTION OF THE DRAWINGS

The above and other features of the present invention, its nature and various advantages will be more apparent upon consideration of the following detailed description, taken in conjunction with the accompanying drawings in which:

FIG. 2 is a schematic view of an illustrative display screen showing a playlist of media items listed in the order in which they were added to the playlist in accordance with one embodiment of the invention;

FIG. 3 is a schematic view of an illustrative display screen showing a playlist of media items listed in artist order in accordance with one embodiment of the invention;

FIG. 4 is a schematic view of an illustrative display screen display screen showing a playlist of media items ordered by popularity in accordance with one embodiment of the invention;

DETAILED DESCRIPTION

Figure 1:
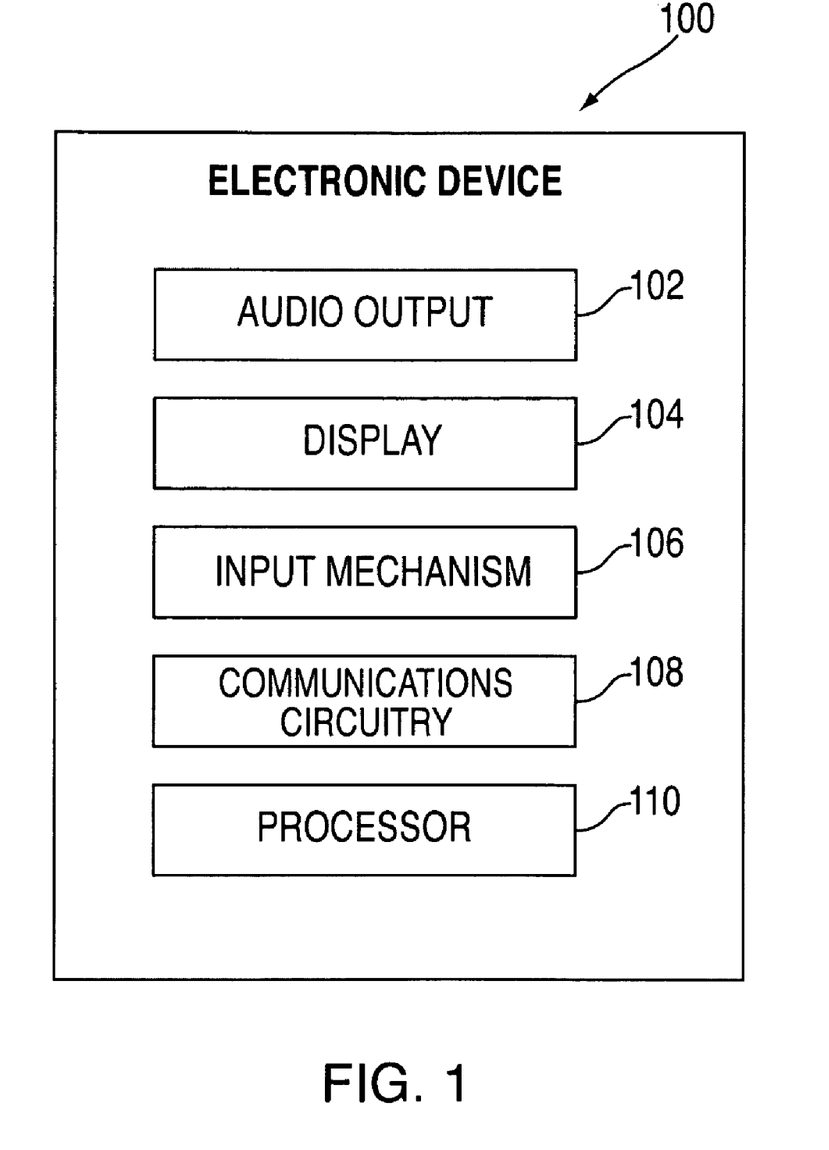
FIG. 1 is a schematic view of an electronic device in accordance with one embodiment of the invention.

FIG. 1 is a schematic view of an electronic device in accordance with one embodiment of the invention. Electronic device 100 may include audio output 102, display 104, input mechanism 106, communications circuitry 108 and control circuitry 110.

Audio output 102 may include any suitable audio component for providing audio to the user of electronic device 100. For example, audio output 102 may include one or more speakers (e.g., mono or stereo speakers) built into electronic device 100. In some embodiments, audio output 102 may include an audio component that is remotely coupled to electronic device 100. For example, audio output 102 may include a headset, headphones or earbuds that may be coupled to electronic device with a wire (e.g., coupled to electronic device 100 with a jack) or wirelessly (e.g., Bluetooth® headphones or a Bluetooth® headset).

Display 104 may include any suitable screen or projection system for providing a display visible to the user. For example, display 104 may include a screen (e.g., an LCD screen) that is incorporated in electronic device 100. As another example, display 104 may include a movable display or a projecting system for providing a display of content on a surface remote from electronic device 100 (e.g., a video projector). Display 104 may be operative to display content (e.g., information regarding ongoing communications operations, information regarding incoming communications requests, media, or device operation screens) under the direction of control circuitry 110. In some embodiments, audio output 102 and display 104 can be combined as output circuitry.

Input mechanism 106 may include any suitable mechanism for providing user inputs or instructions to electronic device 100. Input mechanism 106 may take a variety of forms, such as a button, keypad, dial, a click wheel, or a touch screen. The user interface may include a multi-touch screen such as that described in U.S. Pat. No. 6,323,846, which is incorporated by reference herein in its entirety.

Communications circuitry 108 may include any suitable communications circuitry operative to connect to a communications network and to transmit communications (e.g., voice or data) from electronic device 100 to other devices within the communications network. Communications circuitry 108 may be operative to interface with the communications network using any suitable communications protocol such as, for example, Wi-Fi (e.g., a 802.11 protocol), Bluetooth (registered trademark), radio frequency systems (e.g., 900 MHz, 1.4 GHz, and 5.6 GHz communication systems), infrared, GSM, GSM plus EDGE, CDMA, quadband, and other cellular protocols, VOIP, or any other suitable protocol. In some embodiments, communications circuitry 108 may be operative to receive media or data over the Internet (e.g., streaming media or downloaded media). In some embodiments, communications circuitry 108 may be operative to create a communications network using any suitable communications protocol. For example, communications circuitry 108 may create a short-range communications network using a short-range communications protocol to connect to other devices. In some implementations, communications circuitry 108 may be operative to create a local communications network using the Bluetooth® protocol to couple electronic device 108 with a Bluetooth® headset.

Electronic device 100 may include one more instances of communications circuitry 108 for simultaneously performing several communications operations with different devices or providers, and using different communications networks, although only one of each is shown in FIG. 1 to avoid overcomplicating the drawing. For example, electronic device 100 may include a first instance of communications circuitry 108 for communicating over a cellular network, and a second instance of communications circuitry 108 for communicating over Wi-Fi or using Bluetooth. In some embodiments, the same instance of communications circuitry 108 may be operative to provide for communications over several communications networks.

Control circuitry 110 may be operative to control the operations and performance of electronic device 100. Control circuitry 110 may include, for example, a processor, a bus (e.g., for sending instructions to the other components of electronic device 100), memory, storage, or any other suitable component for controlling the operations of electronic device 100. In some embodiments, a processor may drive the display and process inputs received from the user interface. The memory and storage may include, for example, a hard-drive, solid state drive, flash memory, permanent memory such as ROM, any other suitable type of storage component, or any combination thereof. The memory or storage can store, for example, media data (e.g., music and video files), application data (e.g., for implementing functions on device 100), firmware, user preference information data (e.g., media playback preferences), authentication information (e.g. libraries of data associated with authorized users), lifestyle information data (e.g., food preferences), exercise information data (e.g., information obtained by exercise monitoring equipment), transaction information data (e.g., information such as credit card information), wireless connection information data (e.g., information that can enable electronic device 100 to establish a wireless connection), subscription information data (e.g., information that keeps track of podcasts or television shows or other media a user subscribes to), contact information data (e.g., telephone numbers and email addresses), calendar information data, and any other suitable data or any combination thereof.

Control circuitry 110 may be operative to execute instructions provided by firmware, software, or both implemented in electronic device 100. For example, control circuitry 110 may be operative to execute instructions provided by a media streaming application, such as a radio application or a video application. As another example, control circuitry 110 may be operative to execute instructions provided by a communications application (e.g., an email or telephone application, or a remote access application), word processing application, a media playback application (e.g., a music, radio or video playback application), a system utility, a location-detection application, or any other suitable application for controlling operations of the electronic device.

Electronic device 100 may include any other component suitable for performing communications operations. For example, electronic device 100 may include a power supply, ports or interfaces for coupling to a host device, a secondary input mechanism (e.g., an ON/OFF switch), or any other suitable component.

A user of the electronic device can access media for consumption using any suitable approach. In some embodiments, the electronic device can include media locally stored in memory or storage for playback. Instead or in addition, the electronic device may be operative to receive and provide to the user media streamed from a media provider over a communications link, such as for example over the Internet. For example, radio signals or videos (e.g., video clips or television programming) can be received, for example over the Internet, as a media stream. The streamed media may include any suitable media, including for example media available for free to the user of the electronic device, and other media available in exchange for a tax. The user of the electronic device may pay the tax for access to streamed media using any suitable approach, including for example on a per media item basis (e.g., purchase model for media), or on a per unit of time basis (e.g., subscription model for media).

Each media item can be associated with metadata defining characteristics of the item. For example, each media item can include metadata specifying the artist, composer, release date, album, track number, disk number, genre, lyrics, album art, show, episode title, episode name, beats per minute, bit rate, description, sample rate, size, or any other information associated with the media item. In some embodiments, different metadata can be associated with different types of media items. For example, television shows or television series can be associated with show, episode, and air date metadata, which in turn are not provided for music. As another example, music can be associated with artist, album artist, release date, and composer metadata, which in turn are not provided for television shows or movies. In some embodiments, media can be associated with user-defined metadata, such as a user ranking or star rating (e.g., 1 to 5 stars), compilation information (e.g., a user created compilation), or any other user-defined metadata. As another example, each media item can include metadata describing the manner in which the media item was played back, such as play count, skip count, last played, last skipped, date added, and date modified information.

The user can organize the playback of media using any suitable approach. In some embodiments, the user can create a playlist of media items to play back sequentially. The user can define the playlist using any suitable approach, including for example by selecting one or more media items and directing an electronic device to automatically identify other media items related to the selected media items to include in the playlist. As another example, the user can select individual media items to include a playlist (e.g., the user can select individual items from a listing of available items, such as a media library). In some embodiments, the user can select media items having one or more common characteristics. For example, the user can select media items sharing one or more metadata values, such as artist name, album, genre, release date, or any other suitable characteristic.

The order in which media items of a particular playlist are played back can be set in a number of ways. In some embodiments, the playlist order can be defined from the order in which media items were placed in the playlist, which can allow the user to define the media item playback order. FIG. 2 is a schematic view of an illustrative display screen showing a playlist of media items listed in the order in which they were added to the playlist in accordance with one embodiment of the invention. Display 200 can include listing 210 of media items in a playlist. Each media item can be identified by several metadata characteristics, including for example media item name 214 (e.g., track name), time 216 (e.g., media item duration), artist 218, and album 220 (e.g., album by artist metadata). It will be understood, however, that the particular metadata used in display 200 is merely illustrative and that any other metadata could be used instead of or in addition to the metadata described above. In addition to the media item specific metadata characteristics, each media item can be associated with a characteristic specific to the playlist. For example, each media item can be associated with an order listed in order field 212 defining the order in which the media items were added to the playlist (e.g., the order in which each media item was added, or the order in which groups of items were added). The media items of listing 210 can be ordered using any of the displayed metadata fields or the playlist specific order field. In the example of display 200, the media items of listing 210 are ordered based on order field 212.

FIG. 3 is a schematic view of an illustrative display screen showing a playlist of media items listed in artist order in accordance with one embodiment of the invention. Display 300 can include listing 310 of media items in a playlist. Each media item can be identified by several metadata characteristics, including for example media item name 314 (e.g., track name), time 316 (e.g., media item duration), artist 318, and album 320 (e.g., album by artist metadata). In addition, each media item can be associated with a characteristic specific to the playlist, such as order field 312. Similar to display 200 (FIG. 2), the media items of listing 310 can be ordered using any of the displayed metadata fields or the playlist specific order field. In the example of display 300, the media items of listing 310 are ordered by artist name (e.g., shown in artist field 318).

When a user has access to large amounts of media, the user can create a playlist having at least some media items with which the user is not familiar (e.g., a playlist including all media by a particular artist, or all media in an album). As the user first listens to a playlist having unknown media, the user may wish to first hear the most common or popular songs in the playlist to provide an indication of the other media items in the playlist. For example, if a playlist includes all media items by a particular artist, the user may first wish to hear the artist's top hits before deciding whether to listen to lesser known music by the same artist. To ensure that the better known media in the playlist is played back first, the media items in the playlist can be re-ordered based on the popularity, familiarity or how recognizable each media item is.

The electronic device providing the play list can determine the popularity, familiarity or notoriety of each media item in the playlist using any suitable approach. In some embodiments, the electronic device can determine the familiarity of each media item based on chart ranking of media (e.g., music rankings). As another example, the electronic device can determine the familiarity of each media item based on the number of consumers of the media when it is broadcast (e.g., Nielson ratings or measures of how often a broadcast television program is viewed on demand, for example over the Internet). As still another example, the electronic device can determine the familiarity of each media item based on number of tickets sold to view the media (e.g., box office receipts and DVD sales). For the simplicity of the following discussion, the various sources of familiarity or popularity measurements will be described as charts, though it will be understood that any type of source or index providing an indication of popularity or familiarity can be used.

Each chart can be constructed using different criteria to reflect popularity or familiarity. For example, charts can reflect one or more of sales of records, cassettes, compact discs and DVDs, the amount of radio airplay, requests received by radio DJs, voting of songs by listeners or viewers, number of downloaded streams, number of purchases of electronic media items (e.g., from the iTunes music store available from Apple, Inc.), box office receipts, television ratings, recordings of the broadcast media, number of times a media item is viewed from a secondary source (e.g., on-demand transmissions of media), or any other source reflecting the popularity or familiarity of media items. In some embodiments, charts can be limited by geographical region, media genre or type, duration, or any other suitable limit or boundary for the chart data. For example, charts can be provided by country (e.g., American Top 40 in the United States, UK Singles Chart in the United Kingdom, Deutsche Alternative Charts in Germany). As another example, charts can be provided by musical genre (e.g., American Country Countdown and Billboard Top 100). The charts can be provided at any suitable frequency, including for example weekly, monthly, yearly, by decade, or at any other suitable interval.

In some embodiments, a single media item can be found in several charts. For example, a single media item can be in different music charts released over a several week period, as well as in a monthly chart and in a yearly chart. In addition, the position of the media item in a particular chart can change over time (e.g., the media item is in the range of 34 to 7 over 10 weekly charts). As another example, a single item can be found in different charts released in the same time period (e.g., different positions in the American Top 40, American Country Countdown, and UK Singles Charts). The electronic device can take any suitable approach in determining what familiarity value or ranking to use based on the several charts for each media item. In some embodiments, the electronic device can define a conflict resolution algorithm or process for selecting a particular familiarity value (e.g., a chart and associated ranking) to associate with each media item. For example, the conflict resolution algorithm can select rankings based on the relative importance of charts (e.g., the Top 40 chart is more important than the Top 200 chart), the relative ranking in different charts of the media item (e.g., a top 5 ranking in a regional chart is more important than a top 150 ranking in a national chart), the duration that the media item held a ranking or was within a ranking range (e.g., number of weeks in the top 10), geographic region of the chart, criteria used in generating the chart (e.g., a chart using more criteria is more accurate and important than a chart using limited criteria), or any other suitable measure of chart importance. In some embodiments, the user can instead or in addition select a particular ranking or chart to use, or modify the conflict resolution algorithm to reflect personal tastes (e.g., increase the importance of European charts relative United States charts, or assign weights to different charts or sources). The user may, in some cases, define the number or type of popularity charts to use to determine a media item's familiarity (e.g., drag a slider to set the size of the popularity index database used to determine each media item's familiarity).

The electronic device can associate chart information or other familiarity values with each media item using any suitable approach. In some embodiments, the familiarity values can be stored as metadata associated with the media item, and referenced by the electronic device to order media items in a playlist. In some embodiments, the electronic device can instead or in addition query a chart source to determine a familiarity value associated with a particular media item. For example, the electronic device can provide existing metadata associated with the device to the remote source (e.g., artist, title, album, show name, episode ID, or season) from which the remote source can identify the media item and retrieve one or more chart rankings, or a familiarity value derived from the chart rankings. As another example, the electronic device can provide a sample of the media item to the remote source, which the source can review (e.g., play back) to identify the media item and provide the chart rankings or familiarity values.

Once the electronic device has received or determined a familiarity value for each media item in a playlist, the electronic device can compare the familiarity values and order the media items based on the values. In some embodiments, the electronic device can implement a conflicts resolution algorithm or process for determining how to order different media items having the same familiarity value (e.g., different media items having reached the same peak on the same chart). For example, the conflicts resolution process can consider the duration of each media item at a particular ranking or range of rankings, which media item had the most recent high ranking, rankings in other charts, current rankings of each media item, or any other suitable criteria. In some embodiments, the electronic device can instead or in addition bring the conflicts to the user's attention for resolution. Alternatively, the electronic device can allow the user to customize the conflicts resolution process by defining the criteria and steps to use to determine the relative importance of media items in a playlist. Once the media items have been ordered based on familiarity or popularity, the electronic device can play back the media items in the defined order.

FIG. 4 is a schematic view of an illustrative display screen display screen showing a playlist of media items ordered by popularity in accordance with one embodiment of the invention. Display 400 can include listing 410 of media items in a playlist. Each media item can be identified by several metadata characteristics, including for example media item name 414 (e.g., track name), time 416 (e.g., media item duration), artist 418, album 420 (e.g., album by artist metadata), and popularity 422 (e.g., determined from a music chart). The value displayed in popularity field 422 can include any suitable representation of popularity, including for example a graphical representation (e.g., a bar chart), a numerical representation (e.g., a scaled number, for example in the range of 1-100), or raw information (e.g., a chart identifier and ranking, such as Top 40-3 to indicate ranked $3^{rd}$ in American Top 40 chart). In addition, each media item can be associated with a characteristic specific to the playlist, such as order field 412. Similar to display 200 (FIG. 2), the media items of listing 410 can be ordered using any of the displayed metadata fields or the playlist specific order field. In the example of display 400, the media items of listing 410 are ordered by popularity (e.g., shown in popularity field 422).

Figure 5:
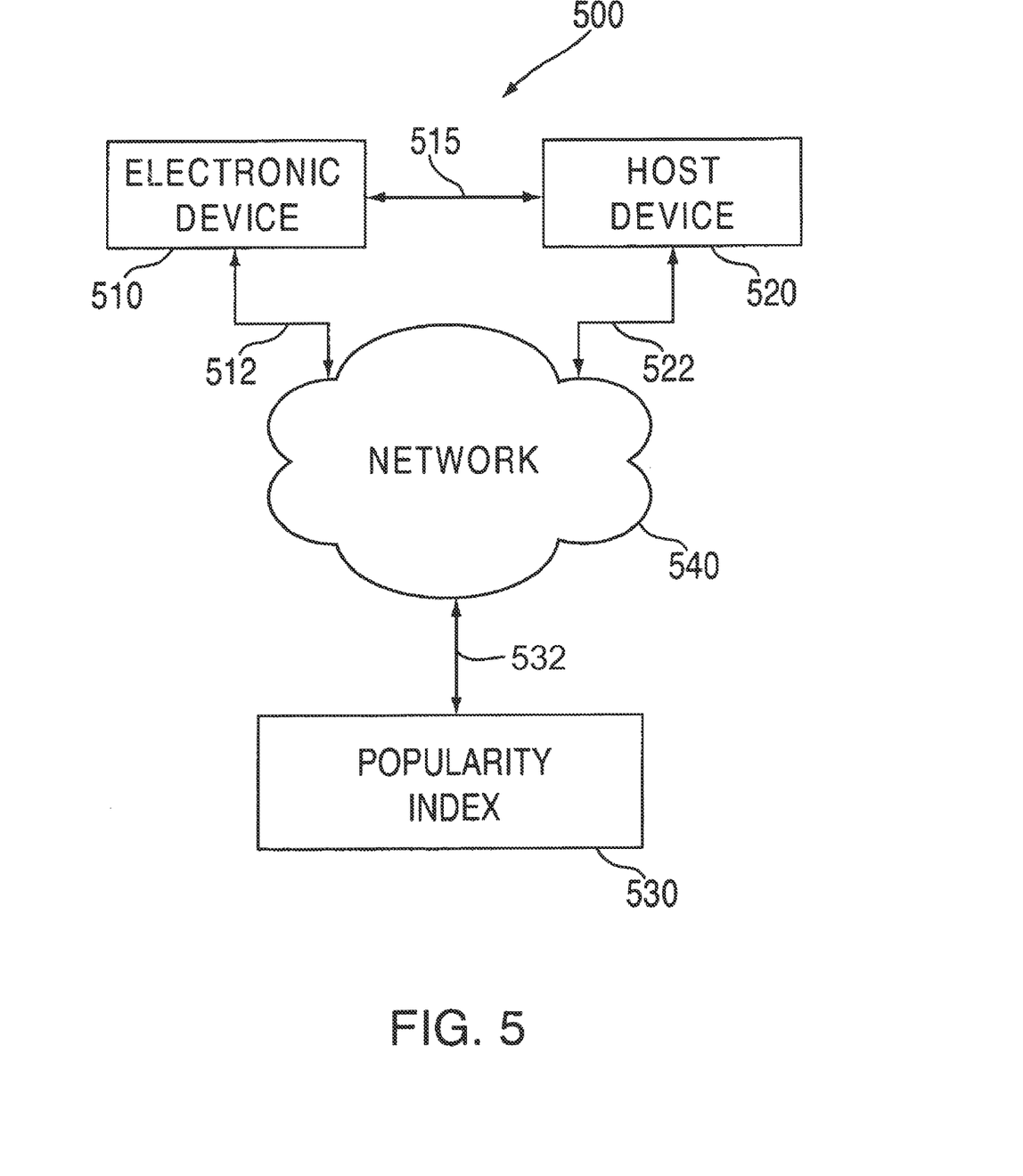
FIG. 5 is a schematic view of a system for receiving popularity information in accordance with one embodiment of the invention.

FIG. 5 is a schematic view of a system for receiving popularity information in accordance with one embodiment of the invention. System 500 can include electronic device 510 and host device 520. Electronic device 510 can include any suitable electronic device, including for example an electronic device having characteristics of electronic device 100 (FIG. 1). Host device 520 can include any suitable electronic device operative to be coupled to electronic device 510 to provide one or more of data and power. For example, host device 520 may provide a source of media to be locally stored on or accessed by electronic device 510. Electronic device 510 and host device 520 can communicate over communications link 515, which can include any suitable wired or wireless communications link or path (or combinations of these).

Electronic device 510 and host device 520 can receive popularity or familiarity data from popularity index 530. Popularity index 530 can include one or more remote servers or sources that have access to information detailing the popularity or familiarity of different media (e.g., information not specific to the manner in which electronic device 510 or host device 520 consumes media). For example, popularity index 530 can include information related to one or more music charts, sales or downloads information, media requests information, or any other information that can be used to generate one or more familiarity values for particular media.

Electronic device 510 and host device 520 can provide requests to and receive familiarity data from popularity index 530 via network 540. In particular, electronic device 510 can be connected to network 540 using communications link 512, host device 520 can be connected to network 540 using communications link 522, and popularity index 530 can be connected to network 540 using communications link 532. Each of communications links 512, 522 and 532 can include any suitable combination of wired and wireless links or paths. Network 540 can include any suitable communications network, including for example a communications network using any suitable communications protocol such as, for example, Wi-Fi (e.g., a 802.11 protocol), Bluetooth (registered trademark), radio frequency systems (e.g., 900 MHz, 1.4 GHz, and 5.6 GHz communication systems), infrared, GSM, GSM plus EDGE, CDMA, quadband, and other cellular protocols, VOIP, or any other suitable protocol. Each of devices 510 and 520, and popularity index 530 can include appropriate communications circuitry to connect to network 540.

Figure 6:
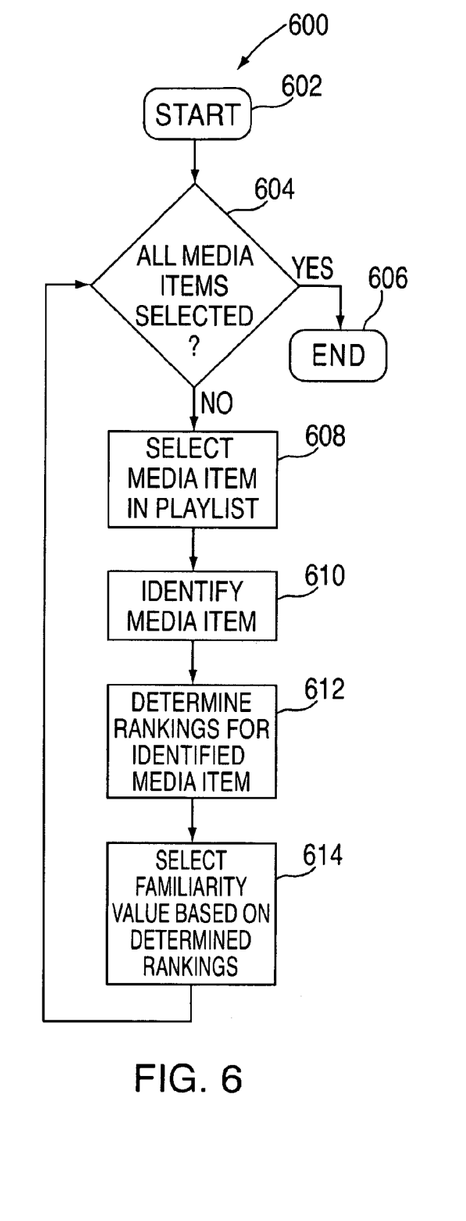
FIG. 6 is a flowchart of an illustrative process for determining the popularity or familiarity of a particular media item in accordance with one embodiment of the invention.

The following flowcharts will describe several processes used to order media items based on familiarity. FIG. 6 is a flowchart of an illustrative process for determining the popularity or familiarity of a particular media item in accordance with one embodiment of the invention. Process 600 may begin at step 602. At step 604, the electronic device can determine whether all media items have been selected. For example, the electronic device can determine whether all media items in an existing playlist have been selected. If the electronic device determines that all media items have been selected, process 600 can move to step 606 and end. If, at step 604, the electronic device instead determines that all media items in the playlist have not been selected, process 600 can move to step 608. At step 608 the electronic device can select a media item in an existing playlist. For example, the electronic device can select the first media item in the playlist based on the existing order of media items (e.g., ordered based on creation, or based on metadata specific to media items).

At step 610, the electronic device can identify the particular selected media item. For example, the electronic device can identify the media item from metadata associated with the media item, such as title, artist, album, show, episode ID, or other suitable metadata. As another example, the electronic device can identify the media item by sampling a portion of the media item and comparing the sampled portion to a library of known media. Once the electronic device has identified the selected media item, process 600 can move to step 612. At step 612, the electronic device can determine rankings information for the identified media item. For example, the electronic device can review charts indicating the popularity of media at particular moments in time and in particular geographic locations to determine whether the identified media item was ever listed in a chart. The electronic device can further determine whether the electronic device was listed in several charts (e.g., several different charts published at the same time, or the same chart published at different times).

At step 614, using the determined rankings, the electronic device can select a familiarity value to associate with the identified media item. For example, the electronic device can define a familiarity value based on a single chart ranking. As another example, the electronic device can define a familiarity value based on several chart rankings (e.g., using a conflict resolution process). As still another example, the electronic device can receive a user selection of a familiarity value (e.g., an arbitrary value or a value selected from a range of allowable values). Process 600 can then return to step 604 and continue to determine whether every media item in the playlist was selected.

Figure 7:
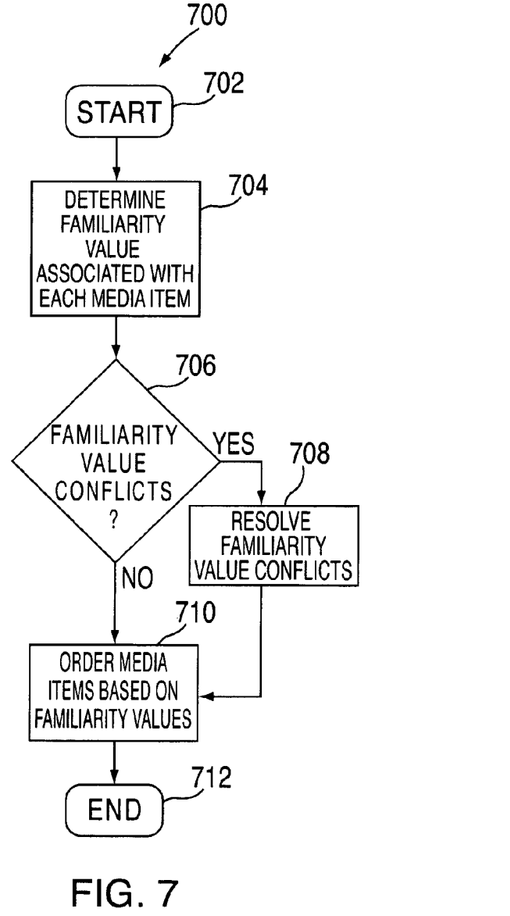
FIG. 7 is a flowchart of an illustrative process for ordering a playlist that includes several media items based on the popularity or familiarity of each media item in accordance with one embodiment of the invention.

FIG. 7 is a flowchart of an illustrative process for ordering a playlist that includes several media items based on the popularity or familiarity of each media item in accordance with one embodiment of the invention. Process 700 may begin at step 702. At step 704, the electronic device can determine the familiarity value associated with each media item in a playlist. For example, the electronic device can execute process 500 (FIG. 5) to determine the familiarity value associated with each media item in the playlist. At step 706, the electronic device can determine whether there are any familiarity value conflicts among the media items in the playlist. For example, the electronic device can determine whether one or more media items have the same chart rankings. As another example, the electronic device can determine whether one or more media items have the same familiarity value associated with different chart rankings. If the electronic device determines that there are familiarity value conflicts among the media items, process 700 can move to step 708.

At step 708, the electronic device can resolve the familiarity value conflicts. For example, the electronic device can apply a conflict resolution algorithm or process to determine the relative popularity or familiarity of the one or more media items having the same familiarity values. The conflict resolution can use any suitable criteria, including for example duration at a particular chart ranking on a particular chart, chart rankings on other charts (e.g., not common charts), date of last ranking, or any other suitable criteria. In some embodiments, the electronic device can instead or in addition receive a user indication of how to resolve the conflict. Process 700 can then move to step 710.

If, at step 706, the electronic device instead determines that there are no familiarity value conflicts, process 700 can move to step 710. At step 710, the electronic device can order the media items in the playlist based on the determined familiarity values. If there were conflicts, the electronic device can use the familiarity values assigned as a result of the conflict resolution process (e.g., step 708), or order media items having the same familiarity value based on the conflict resolution results. The electronic device can then play back the media items in the playlist based on the familiarity value order. Process 700 can then end at step 712.

The above described embodiments of the present invention are presented for purposes of illustration and not of limitation, and the present invention is limited only by the claims which follow.

What is claimed is:

1. A method comprising:
    sending, by an electronic device, metadata associated with a playlist of media items and the electronic device, wherein the playlist of media items includes an order;
    determining, by the electronic device, a familiarity value for each media item in the playlist of media items, wherein the determination is based on a plurality of charts that rank the media items;
    comparing the determined familiarity values for at least two media items in the playlist of media items against one another to identify a conflict, wherein comparing includes determining that the at least two media items from the playlist of media items have a same familiarity value; and
    in response to determining that the at least two media items from the playlist of media items have the same familiarity value, re-ordering the playlist of media items based on the familiarity value for each of the media items and a predetermined conflict resolution criteria.

2. The method of claim 1, wherein the predetermined conflict resolution criteria includes a weight assigned to different charts in the plurality of charts.

3. The method of claim 1, further comprising:
    receiving a request to re-order the playlist of media items based on the plurality of charts that rank the media items.

4. The method of claim 1, wherein the plurality of charts that rank the media items includes at least one listing of individual media items sorted by a predetermined popularity criteria.

5. The method of claim 4, wherein the familiarity value of a particular media item is determined from a position of the particular media item in the at least one listing of individual media items.

6. The method of claim 1, wherein re-ordering the playlist of media items based on the predetermined conflict resolution criteria includes using at least one of ranking data or duration data to resolve the conflict.

7. The method of claim 1, wherein at least one of the plurality of charts is associated with geographic data or time data.

8. The method of claim 1, wherein the metadata associated with the playlist of media items includes one or more samples of the media items.

9. The method of claim 1, wherein the metadata associated with the playlist of media items enables a remote server to identify the media items.

10. The method of claim 1, wherein the metadata associated with the playlist of media items includes artist data, title data, album data, show name data, episode identifying data, or season data associated with a media item.

11. The method of claim 1, further comprising:
playing back the plurality of media items in an order of the re-ordered playlist.

12. The method of claim 1, wherein the playlist of media items includes media items from an album.

13. The method of claim 1, wherein the playlist of media items includes media items from a single artist.

14. The method of claim 1, further comprising:
receiving input corresponding to conflict resolution criteria.

15. The method of claim 14, wherein the input defines a type of popularity chart for determining a new familiarity value for each of the two media items from the playlist of media items.

16. A computer-implemented system, comprising:
one or more data processors;
one or more non-transitory computer-readable storage media containing instructions configured to cause the one or more processors to perform operations including:
sending metadata associated with a playlist of media items and the electronic device, wherein the playlist of media items includes an order;
determining a familiarity value for each media item in the playlist of media items, wherein the determination is based on a plurality of charts that rank the media items;
comparing the determined familiarity values for at least two media items in the playlist of media items against one another to identify a conflict, wherein comparing includes determining that the at least two media items from the playlist of media items have a same familiarity value; and
in response to determining that the at least two media items from the playlist of media items have the same familiarity value, re-ordering the playlist of media items based on the familiarity value for each of the media items and a predetermined conflict resolution criteria.

17. The system of claim 16, wherein the predetermined conflict resolution criteria includes a weight assigned to different charts in the plurality of charts.

18. The system of claim 16, further comprising instructions configured to cause the one or more processors to perform operations including:
receiving a request to re-order the playlist of media items based on the plurality of charts that rank the media items.

19. The system of claim 16, wherein the plurality of charts that rank the media items includes at least one listing of individual media items sorted by a predetermined popularity criteria.

20. The system of claim 19, wherein the familiarity value of a particular media item is determined from a position of the particular media item in the at least one listing of individual media items.

21. The system of claim 16, wherein re-ordering the playlist of media items based on the predetermined conflict resolution criteria includes using at least one of ranking data or duration data to resolve the conflict.

22. The system of claim 16, wherein at least one of the plurality of charts is associated with geographic data or time data.

23. The system of claim 16, wherein the metadata associated with the playlist of media items includes one or more samples of the media items.

24. The system of claim 16, wherein the metadata associated with the playlist of media items enables a remote server to identify the media items.

25. The system of claim 16, wherein the metadata associated with the playlist of media items includes artist data, title data, album data, show name data, episode identifying data, or season data associated with a media item.

26. The system of claim 16, further comprising instructions configured to cause the one or more processors to perform operations including:
playing back the plurality of media items in an order of the re-ordered playlist.

27. The system of claim 16, wherein the playlist of media items includes media items from an album.

28. The system of claim 16, wherein the playlist of media items includes media items from a single artist.

29. The system of claim 16, further comprising instructions configured to cause the one or more processors to perform operations including:
receiving input corresponding to conflict resolution criteria.

30. The system of claim 29, wherein the input defines a type of popularity chart for determining a new familiarity value for each of the two media items from the playlist of media items.

31. A computer-program product for re-ordering a playlist of media items, tangibly embodied in a non-transitory machine readable storage medium, including instructions configured to cause a data processing apparatus to:
send metadata associated with a playlist of media items and the electronic device, wherein the playlist of media items includes an order;
determine a familiarity value for each media item in the playlist of media items, wherein the determination is based on a plurality of charts that rank the media items;
compare the determined familiarity values for at least two media items in the playlist of media items against one another to identify a conflict, wherein comparing includes determining that the at least two media items from the playlist of media items have a same familiarity value; and
in response to determining that the at least two media items from the playlist of media items have the same familiarity value, re-order the playlist of media items based on the familiarity value for each of the media items and a predetermined conflict resolution criteria.

32. The computer-program product of claim 31, wherein the predetermined conflict resolution criteria includes a weight assigned to different charts in the plurality of charts.

33. The computer-program product of claim 31, further comprising instructions configured to cause a data processing apparatus to:
receive a request to re-order the playlist of media items based on the plurality of charts that rank the media items.

34. The computer-program product of claim 31, wherein the plurality of charts that rank the media items includes at least one listing of individual media items sorted by a predetermined popularity criteria.

35. The computer-program product of claim 34, wherein the familiarity value of a particular media item is determined from a position of the particular media item in the at least one listing of individual media items.

36. The computer-program product of claim 31, wherein re-ordering the playlist of media items based on the predetermined conflict resolution criteria includes using at least one of ranking data or duration data to resolve the conflict.

37. The computer-program product of claim 31, wherein at least one of the plurality of charts is associated with geographic data or time data.

38. The computer-program product of claim 31, wherein the metadata associated with the playlist of media items includes one or more samples of the media items.

39. The computer-program product of claim 31, wherein the metadata associated with the playlist of media items enables a remote server to identify the media items.

40. The computer-program product of claim 31, wherein the metadata associated with the playlist of media items includes artist data, title data, album data, show name data, episode identifying data, or season data associated with a media item.

41. The computer-program product of claim 31, further comprising instructions configured to cause a data processing apparatus to:
play back the plurality of media items in an order of the re-ordered playlist.

42. The computer-program product of claim 31, wherein the playlist of media items includes media items from an album.

43. The computer-program product of claim 31, wherein the playlist of media items includes media items from a single artist.

44. The computer-program product of claim 31, further comprising instructions configured to cause a data processing apparatus to:
receive input corresponding to conflict resolution criteria.

45. The computer-program product of claim 44, wherein the input defines a type of popularity chart for determining a new familiarity value for each of the two media items from the playlist of media items.

* * * * *